(12) United States Patent
Jin et al.

(10) Patent No.: US 9,890,861 B2
(45) Date of Patent: Feb. 13, 2018

(54) SEALING MEMBER, SCROLL COMPRESSOR INCLUDING A SEALING MEMBER AND METHOD FOR MANUFACTURING A SEALING MEMBER FOR A SCROLL COMPRESSOR

(71) Applicant: LG ELECTRONICS INC., Seoul (KR)

(72) Inventors: Honggyun Jin, Seoul (KR); Munyoung Lee, Seoul (KR); Sangwoo Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 14/948,928

(22) Filed: Nov. 23, 2015

(65) Prior Publication Data
US 2016/0160859 A1    Jun. 9, 2016

(30) Foreign Application Priority Data

Dec. 4, 2014 (KR) ........................ 10-2014-0173052

(51) Int. Cl.
*F03C 2/00* (2006.01)
*F03C 4/00* (2006.01)
(Continued)

(52) U.S. Cl.
CPC ......... *F16J 15/3224* (2013.01); *B29C 33/005* (2013.01); *B29C 45/0025* (2013.01);
(Continued)

(58) Field of Classification Search
CPC .. F04C 18/0215; F04C 23/008; F04C 27/003; F04C 27/005; F04C 2230/21;
(Continued)

(56) References Cited

U.S. PATENT DOCUMENTS

| 2,857,184 A | 10/1958 | Mancusi, Jr. |
| 2014/0271304 A1* | 9/2014 | Jin ..................... F04C 18/0215 |
| | | 418/55.5 |

FOREIGN PATENT DOCUMENTS

| CN | 101190558 | 6/2008 |
| CN | 201093063 | 7/2008 |

(Continued)

OTHER PUBLICATIONS

Chinese Office Action dated Jul. 31, 2017 issued in Application No. 201510870679.4 (with English translation).

*Primary Examiner* — Theresa Trieu
(74) *Attorney, Agent, or Firm* — KED & Associates LLP

(57) ABSTRACT

A scroll compressor is provided that may include a casing, a discharge cover fixed inside of the casing, a first scroll revolved a rotational shaft, a second scroll provided on the first scroll to define compression chambers, the second scroll having an intermediate pressure discharge hole that communicates with a compression chamber of the compression chambers having an intermediate pressure, a back pressure plate provided on the second scroll and having an intermediate pressure suction hole that communicates with the intermediate pressure discharge hole, a floating plate movably provided at a side of the back pressure plate and defining a back pressure chamber, and a sealing member provided between the back pressure plate and the floating plate, the sealing member including a sealing body, and at least one protrusion provided at an incline with respect to a central line that extends in a horizontal direction of the sealing body.

13 Claims, 14 Drawing Sheets
(2 of 14 Drawing Sheet(s) Filed in Color)

(51) Int. Cl.
<table>
<tr><td>F04C 2/00</td><td>(2006.01)</td></tr>
<tr><td>F16J 15/3224</td><td>(2016.01)</td></tr>
<tr><td>F04C 18/02</td><td>(2006.01)</td></tr>
<tr><td>B29C 33/00</td><td>(2006.01)</td></tr>
<tr><td>B29C 45/00</td><td>(2006.01)</td></tr>
<tr><td>F16J 15/3204</td><td>(2016.01)</td></tr>
<tr><td>F01C 19/00</td><td>(2006.01)</td></tr>
<tr><td>F04C 27/00</td><td>(2006.01)</td></tr>
<tr><td>B29L 31/26</td><td>(2006.01)</td></tr>
<tr><td>F04C 23/00</td><td>(2006.01)</td></tr>
</table>

(52) U.S. Cl.
CPC ........ *F01C 19/005* (2013.01); *F04C 18/0215* (2013.01); *F04C 27/003* (2013.01); *F16J 15/3204* (2013.01); *B29C 2045/0034* (2013.01); *B29L 2031/26* (2013.01); *B29L 2031/265* (2013.01); *F04C 23/008* (2013.01); *F04C 2230/21* (2013.01)

(58) Field of Classification Search
CPC ... F01C 1/0215; F01C 19/005; F16J 15/3204; B29L 2031/26; B29L 2031/265; B29C 33/005; B29C 45/0025; B29C 2045/0034
USPC ......... 418/55.1–55.6, 57, 140, 180; 417/310, 417/440
See application file for complete search history.

(56) References Cited

FOREIGN PATENT DOCUMENTS

| | | | |
|---|---|---|---|
| CN | 103317660 | 9/2013 | |
| CN | 104061158 | 9/2014 | |
| DE | 12 47 782 | 8/1967 | |
| DE | 9400067 U1 * | 3/1994 | ............. F16J 15/025 |
| DE | 102008008575 | 1/2011 | |
| FR | 1 361 175 | 5/1964 | |
| KR | 10-0719385 | 5/2007 | |

\* cited by examiner

SEALING MEMBER, SCROLL COMPRESSOR INCLUDING A SEALING MEMBER AND METHOD FOR MANUFACTURING A SEALING MEMBER FOR A SCROLL COMPRESSOR

CROSS-REFERENCE TO RELATED APPLICATION(S)

The present application claims priority under 35 U.S.C. 119 and 35 U.S.C. 365 to Korean Patent Application No. 10-2014-0173052, filed in Korea on Dec. 4, 2014, which is hereby incorporated by reference in its entirety.

BACKGROUND

1. Field

A sealing member, a scroll compressor, and a method for manufacturing a sealing member for a scroll compressor are disclosed herein.

2. Background

A scroll compressor is a compressor that utilizes a fixed scroll having a spiral wrap and an orbiting scroll revolved with respect to the fixed scroll. That is, a scroll compressor is a compressor in which the fixed scroll and the orbiting scroll are engaged with each other to revolve, thereby reducing a volume of a compression chamber, which is formed between the fixed scroll and the orbiting scroll according to an orbiting motion of the orbiting scroll, and thus, increasing in pressure and discharging a fluid through a discharge hole formed in a central portion of the fixed scroll.

Such a scroll compressor has a feature in which suction, compression, and discharge of a fluid are successively performed while the orbiting scroll revolves. Accordingly, a discharge valve and suction valve may be unnecessary in principle. Further, as a number of components forming the scroll compressor is less in comparison to other types of compressors, the scroll compressor may be simplified in structure and rotate at a high speed in comparison to other types of compressors. Furthermore, as a variation in torque required for compression is less, and suction and compression successively occur, a relatively small amount of noise and vibration may occur.

One important issue in scroll compressors is leakage and lubrication between the fixing scroll and the orbiting scroll. That is, to prevent a refrigerant from leaking between the fixed scroll and the orbiting scroll, an end of a wrap has to be closely attached to a surface of a head plate to prevent the compressed refrigerant from leaking. The head plate may refer to a portion that corresponds to a main body of the fixed scroll or the orbiting scroll. That is, the head plate of the fixed scroll may be closely attached to a wrap of the orbiting scroll, and a head plate of the orbiting scroll may be closely attached to a wrap of the fixed scroll.

On the other hand, friction resistance has to be minimized so as to allow the orbiting scroll to smoothly revolve with respect to the fixed scroll. However, the leakage may conflict with lubrication. That is, when the end of the wrap and the surface of the head plate are strongly attached to each other, it may be advantageous with respect to leakage, but friction may increase, increasing damage due to noise and abrasion. On the other hand, when an adhesion strength is low, the friction may be reduced, but a sealing force may decrease, increasing leakage.

Thus, according to the related art, a back pressure chamber having an intermediate pressure defined as a pressure between a discharge pressure and a suction pressure may be formed in a back surface of the orbiting scroll or the fixed scroll to solve limitations with respect to sealing and friction reduction. That is, the back pressure chamber, which communicates with a compression chamber having an intermediate pressure of a plurality of compression chambers formed between the orbiting scroll and the fixed scroll, may be formed to allow the orbiting scroll and the fixed scroll to be adequately attached to each other, thereby solving the limitations with respect to leakage and lubrication.

The back pressure chamber may be formed on a bottom surface of the orbiting scroll or a top surface of the fixed scroll. For convenience of description, the back pressure chamber formed on the bottom surface of the orbiting scroll and the back pressure chamber formed on the top surface of the fixed scroll may be referred to as a lower back pressure type scroll compressor and an upper back pressure type scroll compressor, respectively. The lower back pressure type scroll compressor has advantages in that the lower back pressure type scroll compressor has a simple structure, and a bypass hole is easily formed. However, as the back pressure chamber is formed on the bottom surface of the orbiting scroll that performs the orbiting motion, the back pressure chamber may change in configuration and position according to the orbiting motion. As a result, the orbiting scroll may be tilted, causing vibration and noise. In addition, an O-ring provided to prevent the refrigerant from leaking may be quickly worn out. The upper back pressure type scroll compressor has a relatively complicated structure. However, as the back pressure chamber is fixed in configuration and position, the fixed scroll may not be tilted, and sealing of the back pressure chamber may be good.

An example of the upper back pressure type scroll compressor is disclosed in Korean Patent Application No. 10-2000-0037517 (hereinafter "related art"), entitled "Method for Processing Bearing Housing and Scroll Machine having Bearing Housing", whish is hereby incorporated by reference. FIG. 1 is a view illustrating a sealing member provided outside of a back pressure chamber provided in a scroll compressor according to the related art. FIG. 2 is a cross-sectional view taken along line II-II' of FIG. 1. FIGS. 3A and 3B are simulation views illustrating a sealing process when the sealing member is installed on the scroll compressor according to the related art.

Referring to FIGS. 1 to 3B, in an upper back pressure type scroll compressor according to the related art a sealing member 1 provided between a surface of a back pressure plate 5 and a surface of a floating plate 6 to seal a back pressure chamber is provided. The sealing member 1 may have an approximately annular shape.

The sealing member 1 includes a sealing body 2 having a circular cross-section and a protrusion 3 that protrudes from an outer circumferential surface of the sealing body 2. The protrusion 3 may have a shape that protrudes by a predetermined height from each of inner and outer circumferential surfaces of the sealing body 2. The protrusion 3 may refer to a parting line that occurs when the sealing member 1 is manufactured, for example, a mold is separated in an injection molding process.

FIG. 3A illustrates distribution of pressure applied to the sealing member 1 in a state in which the scroll compressor according to the related art is stopped, and FIG. 3B illustrates distribution of pressure applied to the sealing member 1 in a state in which the scroll compressor according to the related art operates. According to colors, a pressure applied to corresponding portions nay gradually increases in order of blue, green, yellow, orange, and red colors.

When the sealing member 1 is installed in the scroll compressor, a portion on which the protrusion 3 is provided may serve as a sealing surface 4. In this state, when the scroll compressor is driven, the sealing surface changes in position while the floating plate 6 moves upward.

More particularly, a pressure may be applied in an upward direction to the sealing member 1. Thus, the protrusion 3 provided on the inner circumferential surface of the sealing member 1 may move in the upward direction in a state in which the protrusion 3 is closely attached to the floating plate 6. That is, while the scroll compressor is stopped or driven, the protrusion 3 may serve as the sealing surface 4 of the sealing member 1.

As a result, an area to be sealed between the sealing member 1 and the floating plate 6 may be reduced by the protrusion 3, causing leakage of a refrigerant within the back pressure chamber. Also, the protrusion 3 may have a relatively weaker strength than the sealing body 2, and thus, may be easily torn. In addition, when the sealing member 1 is manufactured, the protrusion 3 may have a non-uniform height. Therefore, a sealing effect of the sealing member 1 may be reduced.

As seen by the colors of FIGS. 3A and 3B, as stress is applied to the sealing member 1 through the protrusion 3 having a relatively small area, an intensity of the stress may increase. Thus, a possibility of damage of the sealing member 1 due to fatigue of the sealing member 1 may increase.

BRIEF DESCRIPTION OF THE DRAWINGS

The patent or application file contains at least one drawing executed in color. Copies of this patent or, patent application publication with color drawings(s) will be provided by the Office upon request and payment of the necessary fee.

Embodiments will be described in detail with reference to the following drawings in which like reference numerals refer to like elements, and wherein.

DETAILED DESCRIPTION

Figure 4:
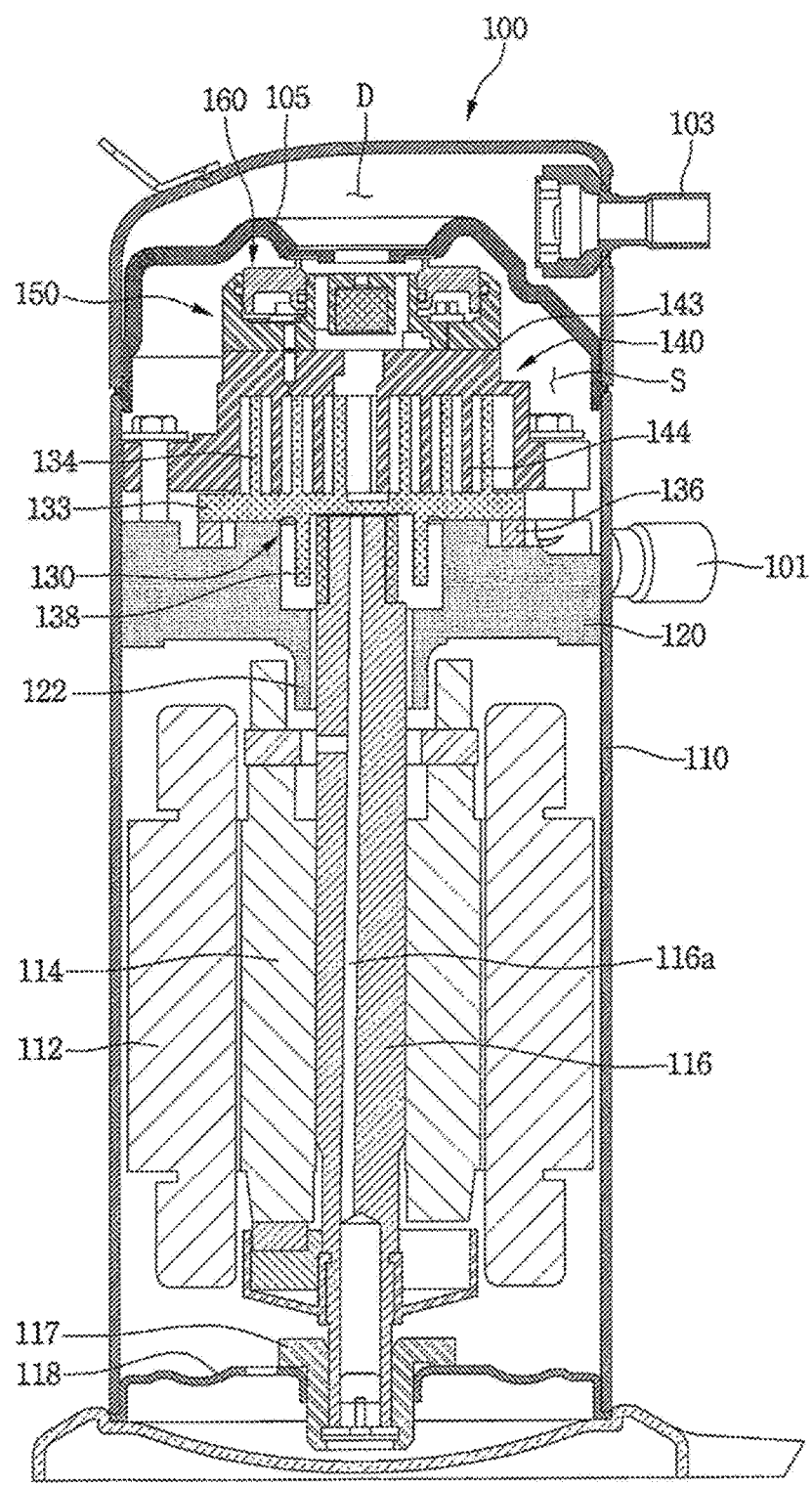
FIG. 4 is a cross-sectional view of a scroll compressor according to an embodiment.
Figure 5:
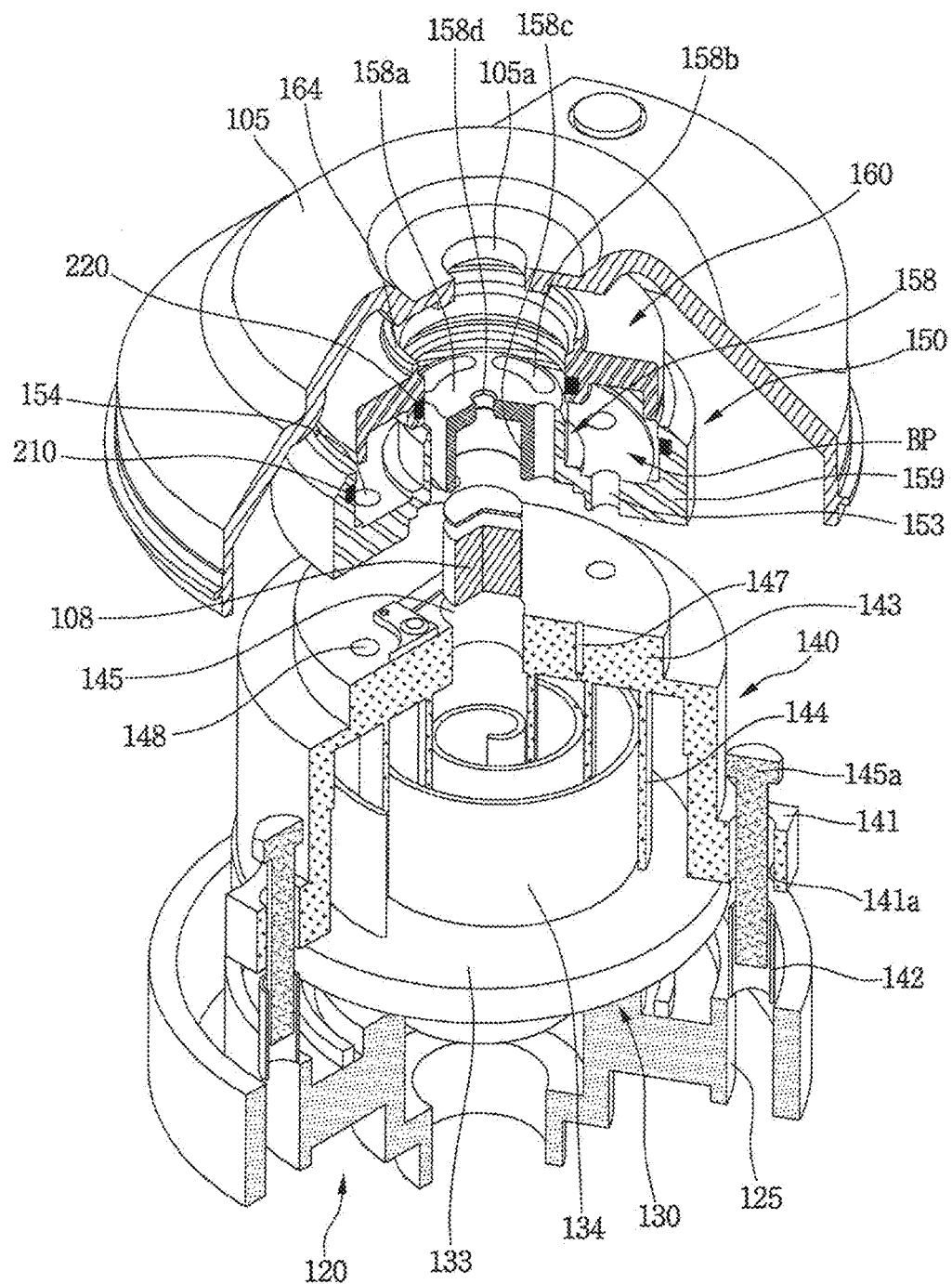
FIG. 5 is a partial exploded cross-sectional view of the scroll compressor according to an embodiment.
Figure 6:
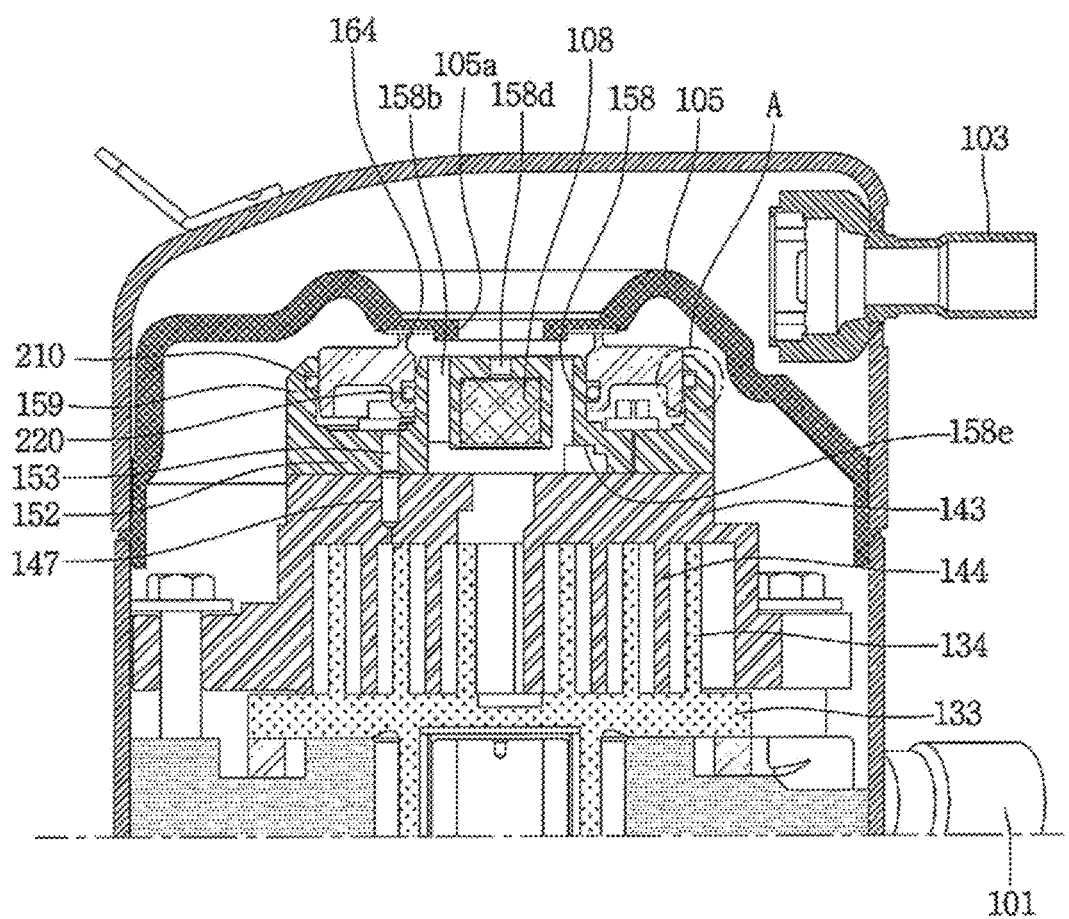
FIG. 6 is a partial cross-sectional view of the scroll compressor according to an embodiment.

FIG. 4 is a cross-sectional view of a scroll compressor according to an embodiment. FIG. 5 is a partial exploded cross-sectional view of the scroll compressor according to an embodiment. FIG. 6 is a partial cross-sectional view of the scroll compressor according to an embodiment.

Referring to FIGS. 4 to 6, a scroll compressor 100 according to an embodiment may include a casing 110 having a suction space S and a discharge space D. A discharge cover 105 may be provided in an inner upper portion of the casing 110. An inner space of the casing 110 may be partitioned into the suction space S and the discharge space D by the discharge cover 105. An upper side of the discharge cover 105 may correspond to the discharge space D, and a lower side of the discharge cover 105 may correspond to the suction space S. A discharge hole 105a, through which a refrigerant compressed to a high pressure may be discharged, may be defined in an approximately central portion of the discharge cover 105.

The scroll compressor 100 may further include a suction port 101 that communicates with the suction space S and a discharge port 103 that communicates with the discharge space D. Each of the suction port 101 and the discharge port 103 may be fixed to the casing 101 to allow the refrigerant to be suctioned into the casing 110 or discharged outside of casing 110.

A motor may be provided on or at a lower portion of the suction space S. The motor may include a stator 112 coupled to an inner wall of the casing 110, a rotor 114 rotatably provided within the stator 112, and a rotational shaft 116 that passes through a central portion of the stator 114.

A lower portion of the rotational shaft 116 may be rotatably supported by an auxiliary bearing 117 provided on or at a lower portion of the casing 110. The auxiliary bearing 117 may be coupled to a lower frame 118 to stably support the rotational shaft 116.

The lower frame 18 may be fixed to the inner wall of the casing 110, and a bottom surface of the casing 110 may be used as an oil storage space. Oil stored in the oil storage space may be transferred upward by an oil supply passage 116a defined in the rotational shaft 116, and then, may be uniformly supplied into the casing 110. The oil supply passage 116a may be eccentrically provided toward any one side so that the oil introduced into the oil supply passage 116a may flow upward by a centrifugal force generated by rotation of the rotational shaft 116.

An upper portion of the rotational shaft 116 may be rotatably supported by a main frame 120. The main frame 120 may be fixed to the inner wall of the casing 110, similar to the lower frame 118. A main bearing 122 that protrudes downward may be provided on a bottom surface of the main frame 120. The rotational shaft 116 may be inserted into the main bearing 122. An inner wall of the main bearing 122 may function as a bearing surface so that the rotational shaft 116 may smoothly rotate.

An orbiting scroll 130 may be provided on a top surface of the main frame 120. The orbiting scroll 130 may include a first head plate 133 having an approximately disk shape and provided on the main frame 120, and an orbiting wrap 134 having a spiral shape and extending from the first head plate 133. The first head plate 133 may define a lower portion of the orbiting scroll 130 and may function as a main body of the orbiting scroll 130, and the orbiting wrap 134 may extend upward and from the first head plate 133 to define an upper portion of the orbiting scroll 130. The orbiting wrap 134 together with a fixed wrap 144, which will be described hereinafter, of a fixed scroll 140 may define a compression chamber. The orbiting scroll 130 may be referred to as "first scroll", and the fixed scroll 140 may be referred to as a "second scroll".

The first head plate 133 of the orbiting scroll 130 may revolve in a state in which the first head plate 133 is supported on a top surface of the main frame 120. An Oldham ring 136 may be provided between the first head plate 133 and the main frame 120 to prevent the orbiting scroll 130 from revolving. A boss 138, into which upper portion of the rotational shaft 116 may be inserted, may be provided on a bottom surface of the first head plate 133 of the orbiting scroll 130 to easily transmit a rotational force of the rotational shaft 116 to the orbiting scroll 130. The fixed scroll 140 engaged with the orbiting scroll 130 may be provided on the orbiting scroll 130.

The orbiting scroll 130 may include a plurality of pin supports 141 that protrudes from an outer circumferential surface of the orbiting scroll 130 and each of which may have a guide hole 141a, a guide pin 142 inserted into the guide hole 141a and provided on the top surface of the main frame 120, and a coupling member 145a inserted into the guide pin 142 and fitted into an insertion hole of the main frame 120.

The fixed scroll 140 may include a second head plate 143 having a disk shape, and the fixed wrap 144 that extends from the second head plate 143 toward the first head plate 133 and engaged with the orbiting wrap 134 of the orbiting scroll 130. The second head plate 143 may define an upper portion of the fixed scroll 140 and function as a main body of the fixed scroll 140, and the fixed wrap 144 may extend downward from the second head plate 143 to define a lower portion of the fixed scroll 140. For convenience of description, the orbiting wrap 134 may be referred to as a "first wrap", and the fixed wrap may be referred to as a "second wrap".

An end of the fixed wrap 144 may contact the first head plate 133, and an end of the orbiting wrap 134 may contact the second head plate 143. The fixed wrap 144 may extend in a predetermined spiral shape, and a discharge hole 145, through which the compressed refrigerant may be discharged, may be defined in an approximately central portion of the second head plate 143. A suction hole (not shown), through which the refrigerant within the suction space S may be suctioned, may be defined in a side surface of the fixed scroll 140. The refrigerant suctioned through the suction hole may be introduced into the compression chamber defined by the orbiting wrap 134 and the fixed wrap 144.

The fixed wrap 144 and the orbiting wrap 134 may define a plurality of compression chambers. Each of the plurality of compression chambers may be reduced in volume while revolving and moving to the discharge hole-side to compress the refrigerant. Thus, a compression chamber of the plurality of compression chambers adjacent to the suction hole may be minimized in pressure, and a compression chamber that communicates with the discharge hole 145 may be maximized in pressure. A compression chamber of the plurality of compression chambers between the above-described compression chambers may have an intermediate pressure that corresponds to a pressure between a suction pressure of the suction hole and a discharge pressure of the discharge hole 145. The intermediate pressure may be applied to a back pressure chamber BP, which will be described hereinafter, to press the fixed scroll 140 toward the orbiting scroll 130.

An intermediate pressure discharge hole 147 to transfer the refrigerant of the compression chamber having the intermediate pressure to the back pressure chamber BP may be defined in the second head plate 143 of the fixed scroll 140. That is, the intermediate pressure discharge hole 147 may be defined in a portion of the fixed scroll 130 at which the pressure in the compression chamber that communicates with the intermediate pressure discharge hole 147 is greater than the pressure in the suction space S and less than the pressure in the discharge space D. The intermediate pressure discharge hole 147 may pass from a top surface to a bottom surface of the second head plate 143.

A back pressure chamber assembly 150 and 160 that defines the back pressure chamber BP may be provided on the fixed scroll 140. The back pressure chamber assembly 150 and 160 may include a back pressure plate 150, and a floating plate 160 separably coupled to the back pressure plate 150 and fixed to an upper portion of the head plate 143 of the fixed scroll 140.

The back pressure plate 150 may have an approximately annular shape with a hollow and may include a support 152 that contacts the second head plate 143 of the fixed scroll 140. An intermediate pressure suction hole 153 that communicates with the intermediate pressure discharge hole 147 may be defined in the support 152. The intermediate pressure suction hole 153 may pass from a top surface to a bottom surface of the support 152.

A second coupling hole 154 that communicates with the first coupling hole 148 defined in the second head plate 143 of the fixed scroll 140 may be defined in the support 152. The first coupling hole 148 and the second coupling hole 154 may be coupled to each other by a predetermined coupling member.

The back pressure plate 150 may include a plurality of walls 158 and 159 that extends upward from the support 152. The plurality of walls 158 and 159 may include a first wall 158 that extends upward from an inner circumferential surface of the support 152, and a second wall 159 that extends upward from an outer circumferential surface of the support 152. Each of the first and second walls 158 and 159 may have an approximately cylindrical shape.

The first and second walls 158 and 159 together with the support 152 may define a space having a predetermined shape. The space may define the above-described back pressure chamber BP.

The first wall 158 may include a top surface 158a that defines top surface of the first wall 158. The first wall 158 may include an intermediate discharge hole 158b that communicates with the discharge hole 145 of the second head plate 143 to discharge the refrigerant discharged from the discharge hole 145 toward the discharge cover 105. A plurality of the intermediate discharge hole 158b may be provided to pass from a bottom surface of the first wall 158 to the top surface 158a. That is, an inner space of the first wall 158 having a cylindrical shape may communicate with the discharge hole 145 to define a portion of a discharge passage to transfer the discharged refrigerant to the discharge space D.

A discharge valve 108 having are approximately circular pillar shape may be provided inside of the first wall 158. The discharge valve 108 may be provided above the discharge hole 145 and may have a size sufficient to completely cover the discharge hole 145. Thus, when the discharge valve 108 contacts the second head plate 143 of the fixed scroll 140, the discharge valve 108 may close the discharge hole 145.

The discharge valve 108 may be movable upward or downward according to a variation in pressure applied to the discharge valve 108. An inner circumferential surface of the first wall 158 may define as moving guide 158c that guides movement of the discharge valve 108.

A discharge pressure apply hole 158d may be defined in the top surface 158a of the first wall 158. The discharge pressure apply hole 158d may communicate with the discharge space D. The discharge pressure apply hole 158d may be defined in an approximately central portion of the top surface 158a, and the plurality of intermediate discharge holes 158b may be provided to surround the discharge pressure apply hole 158d.

For example, when operation of the scroll compressor 100 stops, the refrigerant flows backward from the discharge space D toward the discharge hole 14 the pressure applied to the discharge pressure apply hole 158d may be greater than the discharge hole-side pressure. That is, the pressure may be applied downward to a top surface of the discharge valve 108, and thus, the discharge valve 108 may move downward to close the discharge hole 145.

On the other hand, if the scroll compressor 100 operates to compress the refrigerant in the compression chamber, when the discharge hole-side pressure is greater than the pressure in the discharge space D, an upward pressure may be applied to a bottom surface of the discharge valve 108 and thus, the discharge valve 108 may move upward to open the discharge hole 145. When the discharge hole 145 is opened, the refrigerant discharged from the discharge hole 145 may flow toward the discharge cover 105 via the intermediate discharge hole(s) 158b, and then, may be discharged outside of the compressor 100 through the discharge port 103 via the discharge hole 105a.

The back pressure plate 150 may include a step 158e provided inside of a portion at which the first wall 158 and the support 152 are connected to each other. The refrigerant discharged from the discharge hole 145 may reach a space defined by the step 158e, and then, may flow to the intermediate discharge hole(s) 158b. The second wall 159 may be spaced a predetermined distance from the first wall 158 to surround the first wall 158.

The back pressure plate 150 may include a space having an approximately U-shaped cross-section formed by the first wall 158, the second wall 159, and the support 152. The floating plate 160 may be provided in the space. The space may be covered by the floating plate 160 and may define the back pressure chamber BP. On the other hand, a space defined by the first and second walls 158 and 159 of the back pressure plate 150, the support 152, and the floating plate 160 may define the back pressure chamber BP.

The floating plate 160 may have an annular plate shape and include an inner circumferential surface that faces an outer circumferential surface of the first wall 158 and an outer circumferential surface that faces an inner circumferential surface of the second wall 159. That is, the inner circumferential surface of the floating plate 160 contact the outer circumferential surface of the first wall 158, and the outer circumferential surface of the floating plate 160 may contact the inner circumferential surface of the second wall 159.

First and second sealing members 210 and 220 may be provided on or at contact portions between the floating plate 160 and the first and second walls 158, and 159, respectively. The first and second sealing members 210 and 220 may include a first sealing member 210 provided on or at a contact portion between the inner circumferential surface of the second wall 159 and the outer circumferential surface of the floating plate 160, and a second sealing member 220 provided on or at a contact portion between the outer circumferential surface of the first wall 158 and the inner circumferential surface of the floating plate 160. For example, the first sealing member 210 may be provided on or at the inner circumferential surface of the second wall 159, and the second sealing member 220 may be provided on or at the inner circumferential surface of the floating plate 160. Refrigerant leakage through contact surfaces between the first and second walls 158 and 159 and the floating plate 160, that is, refrigerant leakage from the back pressure chamber BP may be prevented by the first and second sealing members 210 and 220.

A rib 164 that extends upward may be provided on a top surface of the floating plate 160. For example, the rib 164 may extend upward from the inner circumferential surface of the floating plate 160.

The rib 164 may be movably provided to selectively contact a bottom surface of the discharge cover 105. When the rib 164 contacts the discharge cover 105, the suction space S and the discharge space D may be partitioned. On the other hand, when the rib 164 is spaced from the bottom surface of the discharge cover 105, that is, when the rib 164 moves in a direction away from the discharge cover 105, the suction space S and the discharge space D may communicate with each other.

While the scroll compressor 100 operates, the floating plate 160 may move upward to allow the rib 164 to contact the bottom surface of the discharge cover 105. Thus, the rib 164 may serve as a sealing member so that refrigerant discharged from the discharge hole 145 and passing through the intermediate discharge hole 158b does not leak into the suction space S, but rather, may be discharged into the discharge space D.

On the other hand, when the scroll compressor 100 stops, the floating plate 160 may move downward to allow the rib 164 to be spaced apart from the bottom surface of the discharge cover 105. Thus, the discharge refrigerant provided at the discharge cover-side may flow toward the suction space S through the space between the rib 164 and the discharge cover 105.

Hereinafter, components of the first and second sealing members 210 and 220 will be described hereinafter.

Figure 7:
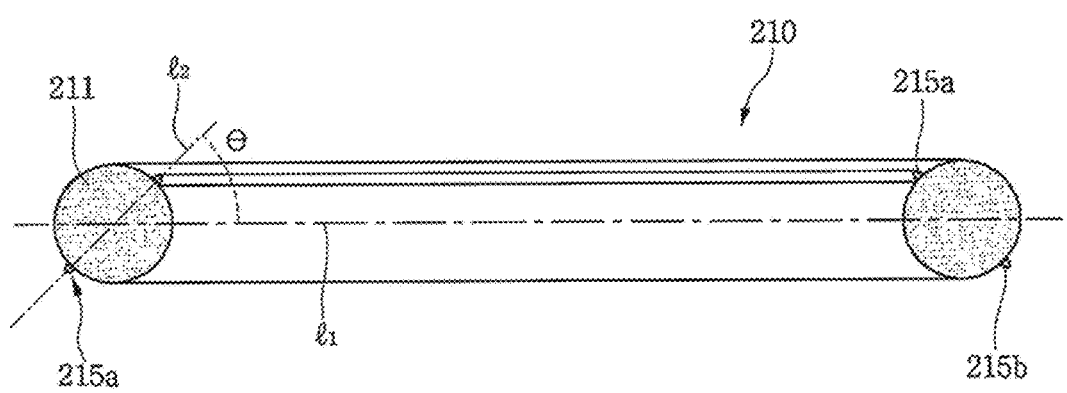
FIG. 7 is a cross-sectional view of a sealing member according to an embodiment.
Figure 8:
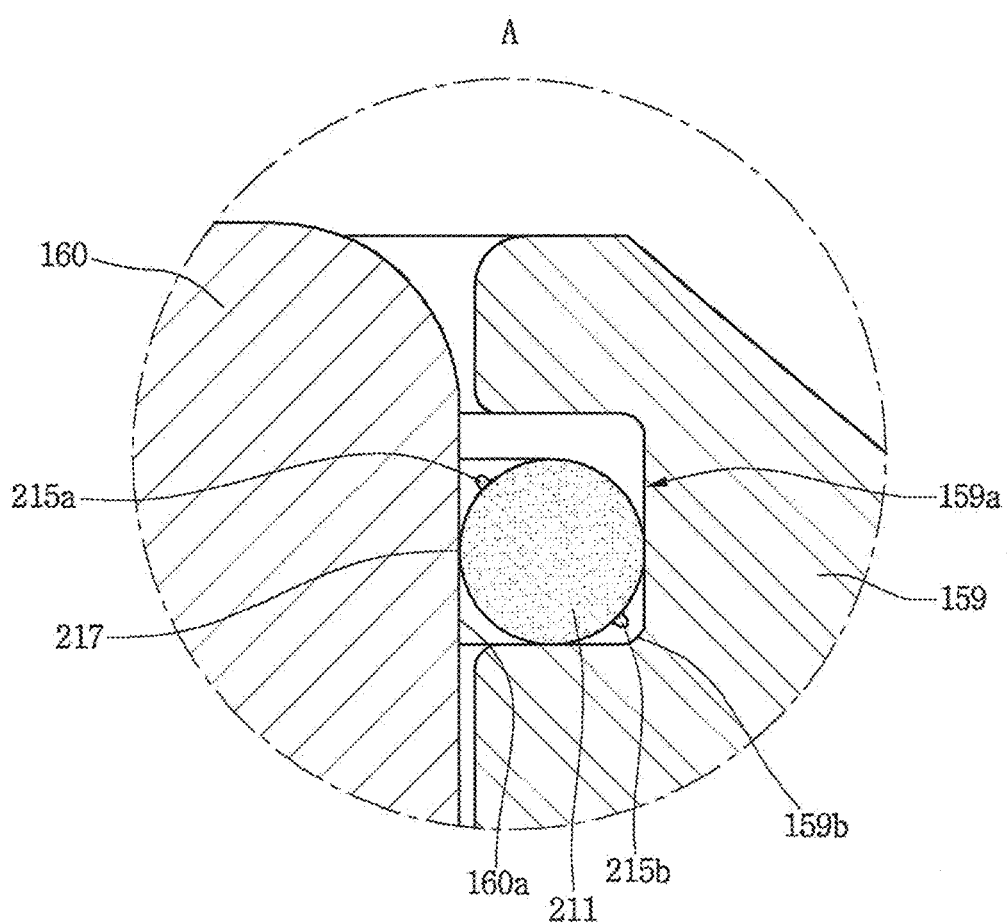
FIG. 8 is an enlarged cross-sectional view illustrating a portion "A" of FIG. 6.

FIG. 7 is a cross-sectional view of a sealing member according to an embodiment. FIG. 8 is an enlarged cross-sectional view illustrating a portion "A" of FIG. 6.

Referring to FIGS. 7 and 8, the first or second sealing member 210 or 220 according to an embodiment may be provided as a component that prevents the refrigerant within the back pressure chamber BP from leaking. Hereinafter, the first sealing member 210 will now be described as an example. However, description of the first sealing member 210 may be equally applied to the second sealing member 200.

Figure 1:
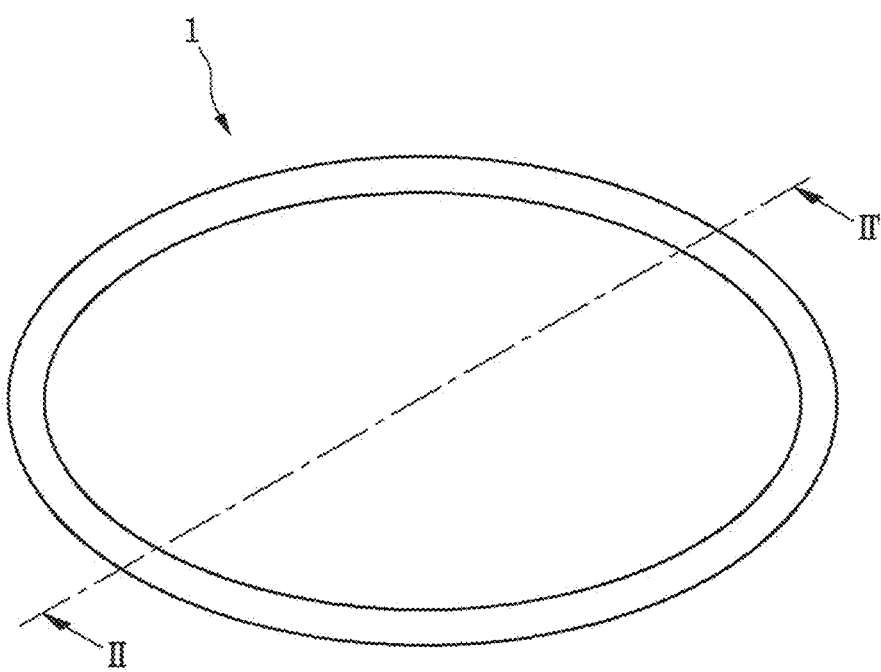
FIG. 1 is a view of a sealing member outside of a back pressure chamber provided in a scroll compressor according to a related art.
Figure 2:
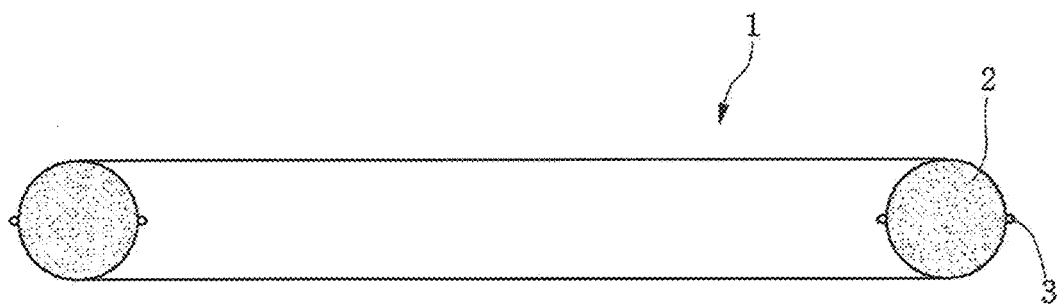
FIG. 2 is a cross-sectional view taken along line II-II' of FIG. 1.
Figure 3A:
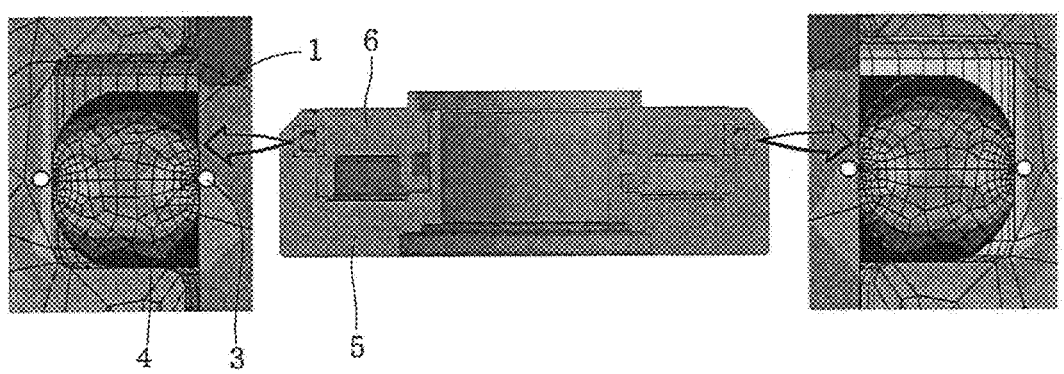
FIGS. 3A and 3B are simulation views illustrating a process in which sealing is realized when the sealing member is installed in the scroll compressor according to the related art.
Figure 3B:
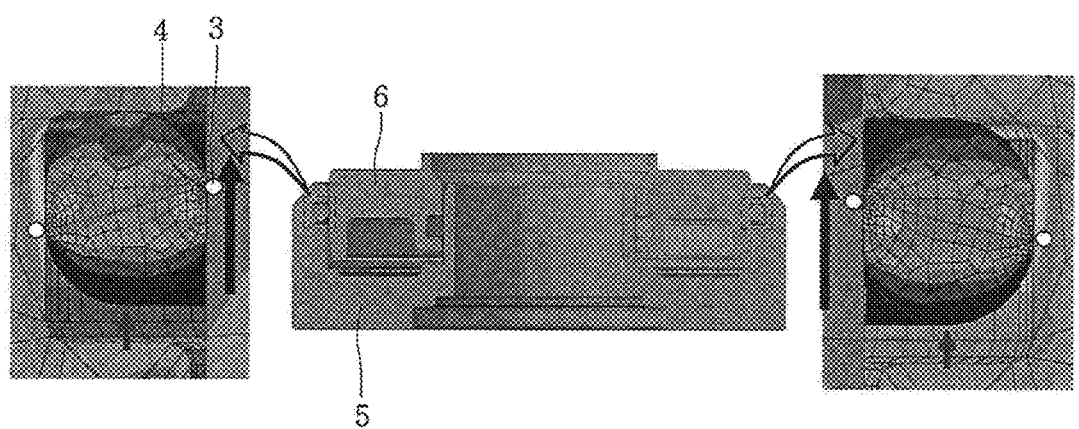

The first sealing member 210 may have an approximately ring shape (see FIG. 1 of the related art). The first sealing member 210 may include a sealing body 211 having an approximately ring shape, and a plurality of protrusions 215a, 215b provided on or at inner and outer circumferential surfaces of the sealing body 211.

The plurality of protrusions 215a, 215b may include a first protrusion 215a that extends along the inner circumferential surface of the sealing body 211, and a second protrusion 215b that extends along the outer circumferential surface of the sealing body 211. Each of the first and second protrusions 215a and 215b may have a ring shape.

When a central line l1 that bisectionally divides the sealing body 211 in a vertical direction of the first sealing member 210 is defined, a virtual line l2 that connects the first protrusion 215a to the second protrusion 215b may be angled at a preset or predetermined angle θ with respect to the central line l1. That is, the central line l1 and the virtual line l2 may cross each other.

The inner and outer circumferential surfaces of the sealing body 211, which contact the central line l1, may for sealing surface of the first sealing member 210. Also, top and bottom surfaces of the sealing body 211 may form the other sealing surface of the first sealing surface 210. The preset or predetermined angle θ may range from about 30° to about 60° to allow the first and second protrusions 215a and 215b to be sufficiently spaced apart from the sealing surfaces of the first sealing member 210.

A recess 159a, in which the first sealing member 210 may be provided, may be defined in the back pressure plate 150. The recess 159a may be recessed from the inner circumferential surface of the second wall 159.

The recess 159a may have a bent inner surface. Thus, the recess 159a may include a bent portion 159b which is bent from one or a first surface toward the other or a second surface thereof. For example, as illustrated in FIG. 8, the bent portion 159b may be provided at a position at which the recess 159a is bent from a bottom surface toward a side surface of the recess 159a and a position at which the recess 159a is bent from the side surface toward a top surface of the recess 159a.

The recess 159a may have a " ⊏ " shape on the whole due to the bent portion 159b. The recess 159a may be coupled to an outer surface 160a of the floating plate 160. An "accommodation portion", in which the first sealing member 210 may be provided, may be defined by the recess 150a and the floating plate 160. For example, the accommodation portion may have an approximately rectangular cross-section. Also, the accommodation portion may have a cross-sectional area equal to or greater than a cross-sectional area of the sealing body 211.

When the first sealing member 210 is accommodated in the accommodation portion, the sealing body 211 may be positioned or supported on a bottom surface of the recess 159a, and the plurality of protrusions 215a and 215b may be positioned or supported in a space except for a space occupied by the sealing body 211. That is, first protrusion 215a may extend from the sealing body 211 toward a point at which the top surface of the recess 159a meets an outer surface 160a of the floating plate 160. The second protrusion 215b may extend from the sealing body 211 toward the bent portion 159b.

On the other hand, a sealing surface 217, at which sealing may be performed on or at an outer surface of the first sealing member 210, may be defined at a point which is spaced apart from the first and second protrusions 215a and 215b. For example, the sealing surface 217 may be defined on or at an upper end and an inner end of the sealing body 211, and the first protrusion 215a may be provided at a point between the upper end and the inner end. The sealing surface 217 may be defined on or at a lower end and an outer end of the sealing body 211, and the second protrusion 215b may be provided at a point between the lower end and the outer end. Thus, as the first and second protrusions 215a and 215b do not have an influence on the sealing surfaces of the first sealing member 210, a reduction in sealing effect of the first sealing member 210 by the first and second protrusions 215a and 215b may be prevented.

As the second sealing member 220 may have the same components as the first sealing member 210, repetitive description has been omitted. However, the second sealing member 220 may be provided in a recess defined in or at an inner surface of the floating plate 160 and an accommodation portion defined by as outer surface of the back pressure plate 150. Description of the recess of the floating plate 160 may be similar to or the same as that of the recess 159a of the second wall 150, and description of the outer surface of the back pressure plate 150 may be similar to or the same as that of the outer surface 160a of the floating plate 160.

Figure 9A:
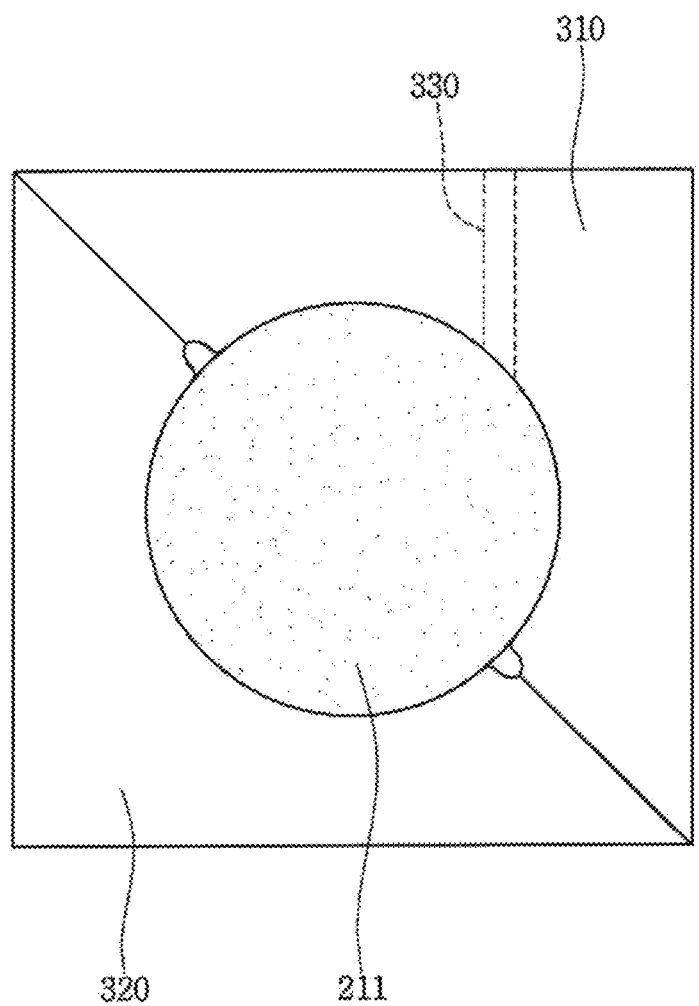
FIGS. 9A to 9C are view illustrating a process of manufacturing a sealing member according to an embodiment.
Figure 9B:
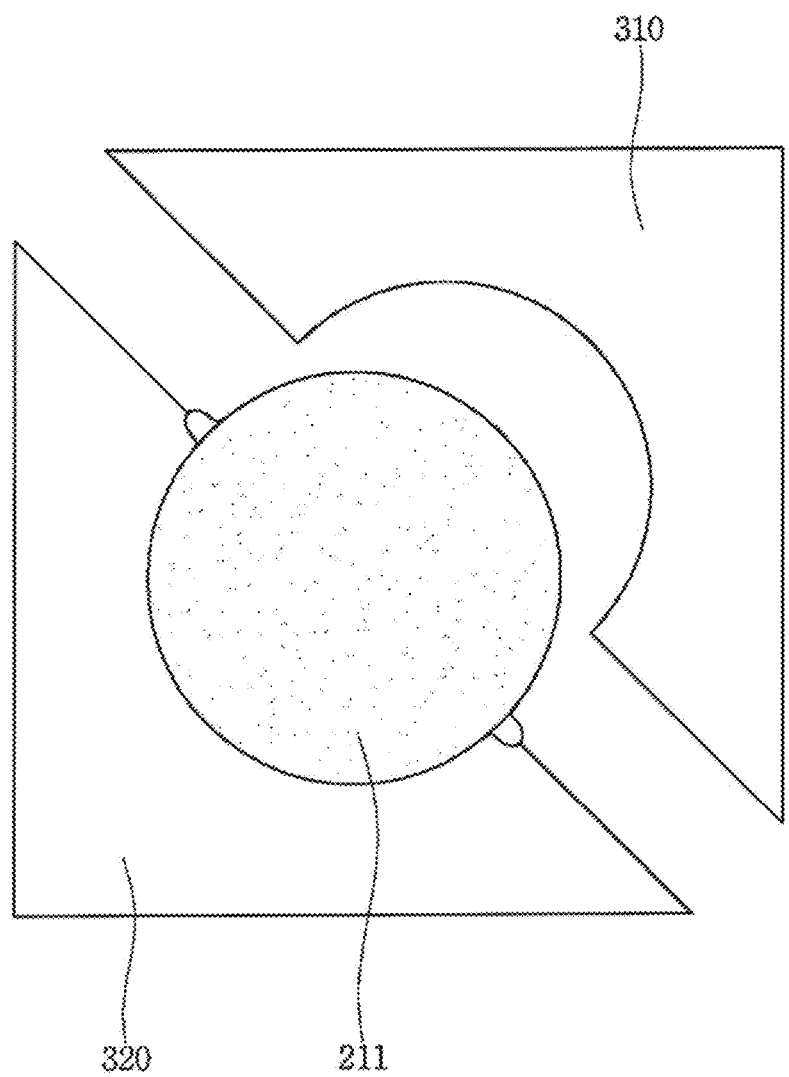
Figure 9C:
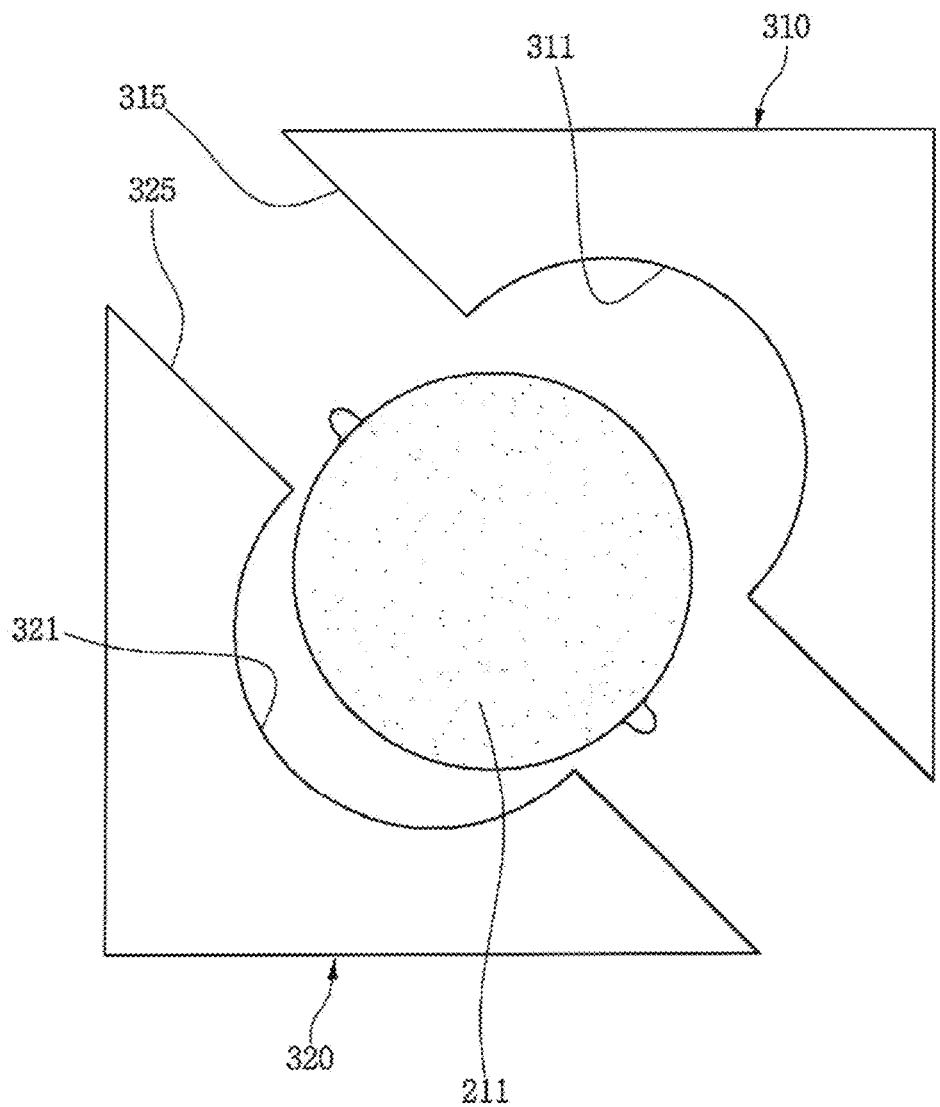

FIGS. 9A to 9C are view illustrating a process of manufacturing a sealing member according to an embodiment. Referring to FIGS. 9A to 9C, the first or second sealing member 210 or 220 according to an embodiment may be injection-molded using a plurality of molds 310 and 320. The plurality of molds 310 and 320 may include a first mold 310 and a second mold 320, which may respectively define injection molding spaces. The first mold 310 may include a first recess 311, and a first inclination part or portion 315 that extends at an incline in both directions of or from the first recess 311. The second mold 320 may include a second recess 321, and a second inclination part or portion 325 that extends at an incline in both directions of or from the second recess 321. In a state in which the first and second molds 310 and 320 contact each other, the first and second recesses 311 and 321 may define injection molding spaces corresponding to each other for the sealing body 211.

An injection passage 330, through which an injection material may be injected into the injection spaces, may be defined in the first or second mold 310 or 320. When the injection material is injected through the injection passage 330 in a state in which the first and second molds 310 and 320 are coupled to each other, the sealing body 211 may be formed in the injection spaces by the injection material.

When the injection material is injected into the injection spaces, a portion of the injection material may be introduced into at least a portion of the portion at which the first and second molds 310 and 320 contact each other. For example, a portion of the injection material may be introduced into a point between a portion that extends from the first recess 311 to the first inclination portion 315 and a portion that extends from the second recess 321 to the second inclination portion 325 by rounding allowance of the first and second recesses 311 and 321. The portion of the introduced injection material may form the first and second protrusions 215a and 215b of the first sealing member 210.

The first and second protrusions 215a and 215b may be formed at a position which is inclined with respect to the central line 11 of the first sealing member 210 by the first and second inclination portions 315 and 325 of the first and second molds 310 and 320. When the sealing body 211 and the first and second protrusions 215a and 215b are completely manufactured, the first and second molds 310 and 320 may be separated.

Figure 10A:
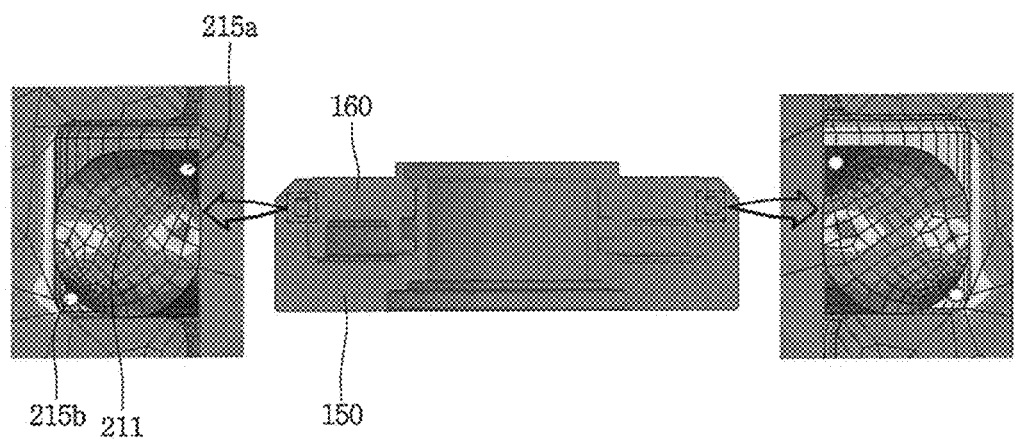
FIGS. 10A and 10B are simulation views illustrating a process in which sealing is realized when the sealing member is installed in the scroll compressor according to an embodiment.
Figure 10B:
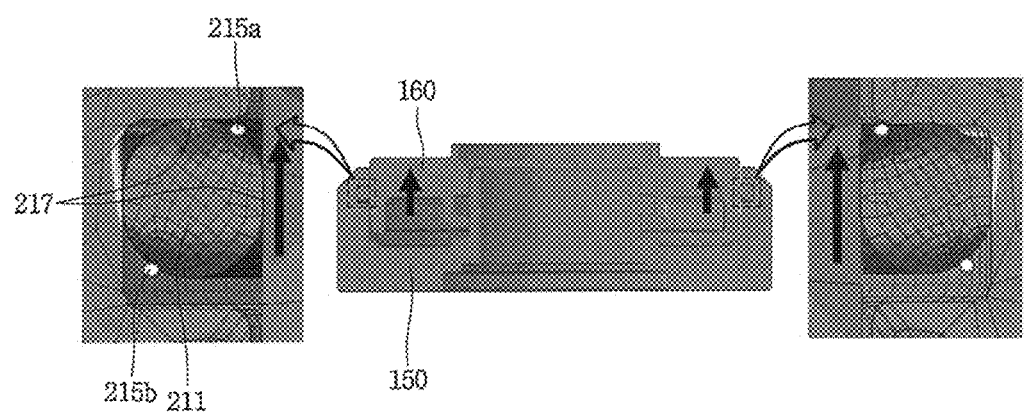

FIGS. 10A and 10B are simulation views illustrating a process in which sealing is realized when the sealing member is installed in the scroll compressor according to an embodiment. FIG. 10A illustrates a simulation of a state in which the first sealing member 210 is installed in the scroll compressor 100, and an operation of the scroll compressor 100 is stopped according to an embodiment.

Referring to FIG. 10A, the first sealing member 210 is seated on a bottom surface of the recess 159a, and a first end and a second end of the sealing body 211 are closely attached to the floating plate 160 and a side surface of the recess 159a so that a relatively large stress acts thereon. The first protrusion 215a may be spaced apart from the first end of the sealing body 211, and the second protrusion 215b may be spaced apart from the second end of the sealing body 211 so that a relatively small stress acts thereon.

In this state, when the scroll compressor 100 operates, an intermediate pressure is generated in the back pressure chamber BP. With this process, the floating plate 160 may move upward. Also, the e sealing body 211 may move upward in the state in which the sealing body 211 is closely attached to the floating plate 160 so that the side surface and the top surface of the sealing body 211 serve as the sealing surface 217. That is, the side surface of the sealing body 211 may be closely attached to the outer surface 160a of the floating plate 160 to serve as the sealing surface 217, and the top surface of the sealing body 211 may be closely attached to the top surface of the recess 159a to serve as the sealing surface 217.

As first and second protrusions 215a and 215b may be spaced apart from the sealing surfaces 217, and thus, do not serve as the sealing surfaces, stress concentration through the first and second protrusions 215a and 215b may not occur. Thus, a sealing effect may be realized over a relatively wide area. Therefore, leakage of the refrigerant may be prevented by the sealing effect, and a possibility of damage to the sealing member may be reduced.

According to embodiments disclosed herein, as protrusions provided on the sealing member are spaced apart from sealing surfaces of the sealing member, reduction of a sealing area of the sealing member by the protrusions may be prevented. Thus, a sealing effect of the sealing member may be improved, preventing the refrigerant within the back pressure chamber from leaking.

Further, as the protrusions are spaced apart from sealing surfaces of the sealing member, stress may act on the sealing member through the sealing body having a relatively wide area. Thus, an intensity of the stress may be reduced, reducing a possibility to damage of the sealing member due to fatigue of the sealing member.

Furthermore, as a coating film is not formed on the accommodation portion of the back pressure plate on which the sealing member is provided, the sealing member may be smoothly moved due to the pressure acting on the sealing member, thereby improving the sealing effect. Also, the mold for injection-molding the sealing member may include the plurality of molds, each of which may have an inclined surface, and the plurality of protrusions provided at an incline with respect to a central line of the sealing member may be easily formed by the plurality of molds.

Embodiments disclosed herein provide a scroll compressor in which a back pressure chamber may be effectively sealed.

Embodiments disclosed herein provide a scroll compressor that may include a casing in which a rotational shaft may be provided; a discharge cover fixed to an inside of the casing to partition the inside of the casing into a suction space and a discharge space; a first scroll revolving by rotation of the rotational shaft; a second scroll disposed or provided on the first scroll to define a plurality of compression chambers together with the first scroll, the second scroll having an intermediate pressure discharge hole that communicates with the compression chamber having an intermediate pressure of the plurality of compression chambers; a back pressure plate placed or provided on the second scroll, the back pressure plate having an intermediate pressure suction hole that communicates with the intermediate pressure discharge hole; a floating plate movably disposed or provided on or at a side of the back pressure plate to define a back pressure chamber together with the back pressure plate; and a sealing member disposed or provided between one surface of the back pressure plate and one surface of the floating plate to prevent refrigerant from leaking from the back pressure chamber. The sealing member may include a sealing body; and a protrusion disposed or provided inclined with respect to a central line (l1) in a vertical direction of the sealing body.

The sealing body may have a sealing surface which may be closely attached to the back pressure plate or the floating plate, and the protrusion may be disposed or provided to be spaced apart from the sealing surface. The protrusion may be include a first protrusion that protrudes from an inner circumferential surface of the sealing body, and a second protrusion that protrudes from an outer circumferential surface of the sealing body.

A virtual line that connects the first protrusion to the second protrusion and the central line (l1) may be angled at a preset or predetermined angle ($\theta$). The preset angle ($\theta$) may range from about 30° to about 60°.

The scroll compressor may further include an accommodation part or portion defined by a recess part or recess defined in the back pressure plate and an outer surface of the floating plate and in which the sealing member may be installed. The sealing body may be seated on a bottom surface of the accommodation part, and the protrusion may protrude from the sealing body toward a point at which the recess part and the outer surface of the floating plate meet each other. The recess part may include a bent portion bent from one surface to the other surface of the recess part, and the protrusion may protrude from the sealing body toward the bent portion.

The back pressure plate may include a support supported by the second scroll; a first wall that extends upward from an inner circumferential surface of the support; and a second wall that extends upward from an outer circumferential surface of the support. The floating plate may be installed in a space part or space which is defined by the first and second walls and the support.

The sealing member may include a first sealing member disposed or provided between the floating plate and an inner circumferential surface of the second wall, and a second sealing member disposed or provided between the floating plate and an outer circumferential surface of the first wall.

Embodiments disclosed herein further provide a method for manufacturing a scroll compressor that may include injecting an injection material into an injection space formed by a first recess part or recess and a second recess part or recess in a state in which a first mold having the first recess part and a first inclination part or portion and a second mold having the second recess part and a second inclination part or portion contact each other; and forming a sealing member when the injection material is completely injected. The sealing member may include a sealing body, and a protrusion disposed or provided inclined or at an incline with respect to a central line (l1) in a vertical direction of the sealing body.

The scroll compressor may include a first scroll that performs an orbiting motion; a second scroll that forms a plurality of compression chambers together with the first scroll, the second scroll having an intermediate pressure discharge hole that communicates with the compression chamber having an intermediate pressure of the plurality of compression chambers; a back pressure plate disposed or provided above the second scroll, the back pressure plate having an intermediate pressure suction hole that communicates with the intermediate pressure discharge hole; and a floating plate movably disposed or provided on a side of the back pressure plate to form a back pressure chamber together with the back pressure plate. The sealing member may be disposed or provided between one surface of the back pressure plate and one surface of the floating plate.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A scroll compressor, comprising:
    a casing in which a rotational shaft is provided;
    a discharge cover provided at an inside of the casing to partition the inside of the casing into a suction space and a discharge space;
    a first scroll revolved by rotation of the rotational shaft;
    a second scroll provided at a side of the first scroll to define a plurality of compression chambers together with the first scroll, the second scroll having an intermediate pressure discharge hole that communicates with a compression chamber of the plurality of compression chambers having an intermediate pressure;
    a back pressure plate provided on the second scroll and having an intermediate pressure suction hole that communicates with the intermediate pressure discharge hole;
    a floating plate movably provided at a side of the back pressure plate to define a back pressure chamber together with the back pressure plate;
    at least one sealing member provided between a surface of the back pressure plate and a surface of the floating plate to prevent a refrigerant from leaking from the back pressure chamber, wherein the at least one sealing member includes:
        a sealing body; and
        at least one protrusion provided at an incline with respect to a central line that extends in a horizontal direction of the sealing body; and
    an accommodation portion defined by a recess defined in the back pressure plate and an outer surface of the floating plate and in which the sealing member is provided, wherein the sealing body is seated on a bottom surface of the accommodation portion, and wherein the at least one protrusion protrudes from the sealing body toward a point at which the recess and an outer surface of the floating plate meet each other.

2. The scroll compressor according to claim 1, wherein the sealing body has at least one sealing surface which is closely attached to the back pressure plate or the floating plate, and wherein the at least one protrusion is spaced apart from the at least one sealing surface.

3. The scroll compressor according to claim 1, wherein the at least one protrusion includes:
    a first protrusion that protrudes from a first portion of an outer circumferential surface of the sealing body; and
    a second protrusion that protrudes from a second portion of the outer circumferential surface of the sealing body.

4. The scroll compressor according to claim 3, wherein a virtual line that connects the first protrusion to the second protrusion and the central line are angled at a predetermined angle.

5. The scroll compressor according to claim 4, wherein the predetermined angle ranges from approximately 30° to approximately 60°.

6. The scroll compressor according to claim 1, wherein the recess includes a bent portion bent from a first surface to a second surface of the recess, and wherein the at least one protrusion protrudes from the sealing body toward the bent portion.

7. The scroll compressor according to claim 1, wherein the back pressure plate includes:
    a support supported by the second scroll;
    a first wall that extends in an upward direction from an inner circumferential surface of the support; and
    a second wall that extends in the upward direction from an outer circumferential surface of the support.

8. The scroll compressor according to claim 7, wherein the floating plate is provided in a space defined by the first and second walls and the support.

9. The scroll compressor according to claim 8, wherein the at least one sealing member includes:
    a first sealing member provided between the floating plate and an inner circumferential surface of the second wall; and
    a second sealing member provided between the floating plate and an outer circumferential surface of the first wall.

10. A scroll compressor, comprising:
    a casing in which a rotational shaft is provided;
    a discharge cover provided at an inside of the casing to partition the inside of the casing into a suction space and a discharge space;
    a first scroll revolved by rotation of the rotational shaft;
    a second scroll provided at a side of the first scroll to define a plurality of compression chambers together with the first scroll, the second scroll having an intermediate pressure discharge hole that communicates with a compression chamber of the plurality of compression chambers having an intermediate pressure;
    a back pressure plate provided on the second scroll and having an intermediate pressure suction hole that communicates with the intermediate pressure discharge hole;
    a floating plate movably provided at a side of the back pressure plate to define a back pressure chamber together with the back pressure plate; and
    at least one sealing member provided between a surface of the back pressure plate and a surface of the floating plate to prevent a refrigerant from leaking from the back pressure chamber, wherein the at least one sealing member includes:
        a sealing body; and
        at least one protrusion that protrudes from the sealing body, wherein a recess is provided in the back pressure plate in which the sealing member is provided, wherein the sealing body is seated on a surface of the recess, wherein the at least one protrusion protrudes from the sealing body toward at least one of the surface of the recess or an outer surface of the floating plate, but does not contact the at least one of the surface of the recess or the outer surface of the floating plate.

11. The scroll compressor according to claim 10, wherein the recess includes a bent portion bent from a first surface to a second surface of the recess, and wherein the at least one protrusion protrudes from the sealing body toward the bent portion.

12. The scroll compressor according to claim 10, wherein the back pressure plate includes:
- a support supported by the second scroll;
- a first wall that extends in an upward direction from an inner circumferential surface of the support; and
- a second wall that extends in the upward direction from an outer circumferential surface of the support, and wherein the floating plate is provided in a space defined by the first and second walls and the support.

13. The scroll compressor according to claim 12, wherein the at least one sealing member includes:
- a first sealing member provided between the floating plate and an inner circumferential surface of the second wall; and
- a second sealing member provided between the floating plate and an outer circumferential surface of the first wall.

* * * * *